United States Patent
Nytomt et al.

(10) Patent No.: US 8,099,996 B2
(45) Date of Patent: Jan. 24, 2012

(54) METHOD AND SYSTEM FOR KNOCK DETECTION

(75) Inventors: Jan Nytomt, Åmål (SE); Anders Göras, Åmål (SE); Jakob Ängeby, Karlstad (SE); Henric Andersson, Karlstad (SE); Christian Sörqvist, Åmål (SE); Tomas Carlsson, Åmål (SE)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 847 days.

(21) Appl. No.: 11/992,893

(22) PCT Filed: Aug. 28, 2006

(86) PCT No.: PCT/SE2006/050297
§ 371 (c)(1),
(2), (4) Date: Apr. 25, 2008

(87) PCT Pub. No.: WO2007/040447
PCT Pub. Date: Apr. 12, 2007

(65) Prior Publication Data
US 2010/0168990 A1    Jul. 1, 2010

(30) Foreign Application Priority Data
Oct. 3, 2005 (SE) ........................ 0502190

(51) Int. Cl.
*G01L 23/22* (2006.01)
(52) U.S. Cl. .................... 73/35.01; 73/35.03; 73/114.07
(58) Field of Classification Search .............. 73/35.01, 73/35.03, 35.04, 35.06, 35.08, 35.12, 114.07
See application file for complete search history.

(56) References Cited

U.S. PATENT DOCUMENTS

| | | | |
|---|---|---|---|
| 4,337,641 A | 7/1982 | Sugihara et al. | |
| 4,750,103 A | 6/1988 | Abo et al. | |
| 5,803,047 A | 9/1998 | Rask | |
| 5,992,386 A | 11/1999 | Nytomt et al. | |
| 6,298,823 B1 * | 10/2001 | Takahashi et al. | 123/406.37 |
| 6,328,016 B1 * | 12/2001 | Takahashi et al. | 123/406.35 |
| 7,472,687 B2 * | 1/2009 | Zhu et al. | 123/406.34 |
| 7,690,352 B2 * | 4/2010 | Zhu et al. | 123/406.14 |

FOREIGN PATENT DOCUMENTS

JP    57165719    10/1982

OTHER PUBLICATIONS

English Abstract of JP 57165719.

* cited by examiner

*Primary Examiner* — Freddie Kirkland, III
(74) *Attorney, Agent, or Firm* — Dykema Gossett PLLC

(57) ABSTRACT

This invention relates to a method for knock detection in a combustion engine, in which combustion is controlled by a control unit (2), which comprises the steps of, a) obtaining at least one sensor signal (4, 4') carrying information of knock intensity related within a combustion chamber of the combustion engine (1); (b) processing the sensor signal (4, 4') to obtain a knock intensity related detection variable ($z_1$), (c) using said detection variable ($z_1$) in said control unit (2) arranged to avoid a knocking condition in said combustion engine (1), if the value ($z_1$) of said detection variable indicates knock when compared with a threshold value (T) wherein using two different computations/processes for said processing (5, 6) of the at least one sensor signal (4, 4') to obtain two separate sub-values ($y_1$, $y_2$), and thereafter combining said sub-values ($y_1$, $y_2$) to obtain said detection variable ($z_1$).

17 Claims, 3 Drawing Sheets

METHOD AND SYSTEM FOR KNOCK DETECTION

TECHNICAL FIELD

This invention relates to a method for knock detection in a combustion engine, in which combustion is controlled by a control unit, which comprises the steps of,
(a) obtaining at least one sensor signal carrying information of knock intensity within a combustion chamber of the combustion engine;
(b) processing the sensor signal to obtain a knock intensity related value,
(c) using said value in said control unit arranged to avoid a knocking condition in said combustion engine.

PRIOR ART

From John B. Heywood, *Internal Combustion Engine Fundamentals*, McGraw-Hill International Ed., Automotive Technology Series, 1988, p 707 it can be read: "Knock in a spark ignited engine is the spontaneous ignition of the unburned "end-gas" ahead of the flame as the flame propagates across the combustion chamber. It results in an increase in gas pressure and temperature above the normal combustion levels. Knock results in increased local heat fluxes to regions of the piston, the cylinder head, and liner in contact with the end-gas. Increases to between twice and three times the normal heat flux in the end-gas region has been measured. It is thought that the primary knock damage to the piston in this region is due to the combination of extremely high local pressures and higher temperatures."

Knock in internal combustion engines can be measured using a pressure sensor. Let x(k) denote the pressure sensor measurement at combustion cycle k. A measure of the knock intensity can be taken as the maximum amplitude of the band-pass filtered pressure signal, see John B. Heywood, *Internal Combustion Engine Fundamentals*, McGraw-Hill International Ed., Automotive Technology Series, 1988, pp 450 for further details.

The pressure signal is often used as a reference, i.e., it is considered to be the "true" measurement of the knock intensity. However, pressure sensors are expensive and have a short lifetime. Therefore they are not often used in mass production but instead replaced by cheaper sensors. Let $y_l(k)$ denote measurements from such sensors that are not as accurate as the reference (pressure) sensor, where l=1, ..., L is the sensor index.

A model of the measurements from the sensors can be formulated as $$y_l(k) = \alpha_l \cdot x(k) + x(k) \cdot e_l(k) = x(k)(\alpha_l + e_l(k))$$

where
x(k) is the reference measurement,
l=1, ..., L is the sensor index
$y_l$ (k) are measurements from non reference sensors,
$\alpha_l$ is a constant that models the amplification from the reference to the non reference sensor measurement with index l, and
$e_l(k)$ is a measurement noise describing the stochastic behaviour of sensor l.

In a real engine x(k) may assume a continuum of values according to some distribution that describes the behaviour of the sensor. However, in order to be able to determine the probability of false alarm and probability of detection when using a detection strategy we need to confine the values that x(k) can take. Therefore, let the values of x(k) for a normal and knocking cycle, respectively, be defined as follows $$x(k) = \begin{cases} x_0 \\ x_1 \end{cases}, \text{ where } x_0 \text{ and } x_1 \text{ are constants and } x_0 \prec x_1.$$

There are a number of sensors that produce data that can be used to compute the knock intensity from combustion in a cylinder. The pressure sensor was mentioned above as a commonly used reference sensor in which case the knock intensity can be computed as the maximum amplitude of the band-pass filtered pressure trace. Another sensor is the accelerometer, which senses above-normal vibration levels on the cylinder head at the characteristic knock frequency. A third sensor is the ion-current measurement system, e.g. as proposed in U.S. Pat. No. 5,803,047 and U.S. Pat. No. 5,992,386. Then, again, the knock intensity is derived based on a characteristic frequency pretty much using the same basic principles as in the case of accelerometers and pressure sensors.

However, there are other features in the ion-current trace that is correlated to the knock intensity. As cited in the introduction, and e.g. U.S. Pat. No. 5,803,047 and U.S. Pat. No. 5,992,386 it is known that the heat transfer to the engine increases and as a consequence thereof the temperature in the cylinder increases. A temperature rice will increase the ionization level in the cylinder which in turn will lead to an increase in the level of the ion-current. Hence, in combination with a knocking cycle, it is to be expected that the area under the ion-current trace, i.e., the ion-current integral, will increase as compared to a normal combustion. This increase in ion-current may be observed during a knocking cycle and/or in consecutive cycles.

In summary, we have a number of potential measurements available for knock detection, denoted by $y_l(k)$ as defined above. For example, l may refer to an ion sensor, wherein knock intensity measurements is based on a characteristic knock frequency in the ion-current. Moreover l may again refer to an ion sensor, wherein instead the integral (sum) of the ion-current trace over a certain interval is used to measure knock intensity. As a final example l may refer to a measurement from an accelerometer.

Classical knock detection as in U.S. Pat. No. 5,803,047 and U.S. Pat. No. 5,992,386 is typically based on one of the aforementioned sensor measurements. Then the knock sensor output is compared to a threshold and a knock alarm is alerted if the knock intensity is greater than the threshold, i.e., typically a knock detection algorithm has the following structure

```
if x(k) > T then
    knock alarm,
else
    OK (normal combustion),
end
```

Of course, if the sensor is not a reference (pressure) sensor, then the choice of the threshold T together with the noise and signal characteristics determine the probability of false alarm, correct detection, and correct rejection and missed detection; see Steven M. Kay, *Fundamentals of Statistical Signal Processing, Volume 2: Detection Theory*, Prentice Hall Signal Processing Series, for further details. For example, if T is increased, then the probability of false knock alarm will decrease at the expense of an increased probability of missed knock detection. There is a trade-off when choosing T and which T to choose depends on the application. The threshold T may also be made data dependent. For example, it may be a function of an estimate of the noise variance. However, such a strategy may lead to complications if the noise variance depends on the engine working point (load and engine speed). To illustrate this point, consider a case when the noise is high at one working point and low in another. When the engine has been run at a working point with a high noise level and the detection algorithm is tuned to a predetermined probability of false alarm, then the detection strategy will be "blind" with respect to knocks when the engine switches to a working point characterized by a low noise level due to the latency in the estimate of the noise variance. This phenomenon may seriously damage the overall performance of the knock detection system and be harmful to the engine.

In U.S. Pat. No. 5,803,047 the above problem is partly handled by using correction parameter that is combined with the detection variable in conjunction with performing the control. Hence, prior art, e.g. U.S. Pat. No. 5,803,047, uses a method for knock detection in a combustion engine, in which combustion is controlled by a control unit, which comprises the steps of,
(a) obtaining at least one sensor signal carrying information of knock intensity within a combustion chamber of the combustion engine (1);
(b) processing the sensor signal (4, 4') to obtain a knock intensity related detection variable ($z_1$),
(c) using said detection variable ($z_1$) in said control unit (2) arranged to avoid a knocking condition in said combustion engine (1), if the value ($z_1$) of said detection variable indicates knock when compared with a threshold value (T)

However, such a control strategy is not very reliable and does not perform well in dynamic environments, e.g. in "blind" detection situations.

BRIEF SUMMARY OF THE INVENTION

The above mentioned deficiency/problem is eliminated or at least minimized by means of the invention which relates to a method for knock detection in a combustion engine, in which combustion is controlled by a control unit, which comprises the steps of,
(a) obtaining at least one sensor signal carrying information of knock intensity within a combustion chamber of the combustion engine;
(b) processing the sensor signal to obtain a knock intensity related detection variable,
(c) using said detection variable in said control unit arranged to avoid a knocking condition in said combustion engine, if the value of said detection variable indicates knock when compared with a threshold value,
wherein two different computations/processes for said processing of the at least one sensor signal is used to obtain at least two separate sub-values, and thereafter combining said sub-values to obtain said detection variable.

Thanks to the invention improved detection characteristics is achieved which in turn leads to improved possibilities of achieving high quality control of a combustion engine.

According to further aspects of the invention:
said processing relates to computations correlated to knock intensity from one and the same sensor, which may be beneficial from several view points, e.g. a cost view point.
said sensor is an ion-sensor and that said sub-values relate to the energy of a characteristic frequency and the integral of the ion current respectively, which provides for a specifically beneficial set of sub-values, since they are well known per se for the skilled person within the field.
said sensor is a pressure sensor and that said sub-values relate to the energy of a characteristic frequency and the integral of the pressure trace respectively, which may be a more preferred manner of achieving the invention (depending on the development of prise level of a pressure sensor in relation to an ion sensor). It is believed that the cost level for pressure sensors may drastically drop in the near future and thereby possibly present an even more preferred sensor solution than the use of an ion sensor.
said processing relates to computation of sensor signals from different sensors, which provide the advantage that even more sub-values may be used, e.g. leading to increased reliability.
said processing relates to computations of information from different combustion cycles, which in certain embodiments may achieve an optimized solution, e.g. will lead to improved performance if also these values are related to the knocking condition.
said information related to knock intensity at cycle k, is combined with information from cycle k+1, which normally would be a preferred manner of using information from different combustion cycles, since the probability of achieving improved detection normally is higher when using information from a nearby cycle, than from a cycle further away.
said control includes comparing said value with a threshold value and that said threshold value depends on the working point of the engine, which may be a beneficial way of achieving optimized control in a rather straight forward and easily handled manner.
said control includes comparing said value with a threshold value and that said threshold depends on measurements, which in some cases might be a manner of achieving the objectives of the invention in an adaptive mode.

BRIEF DESCRIPTION OF THE FIGURES

In the following the invention will be described more in detail with reference to the enclosed figures, wherein.

DETAILED DESCRIPTION

Figure 1:
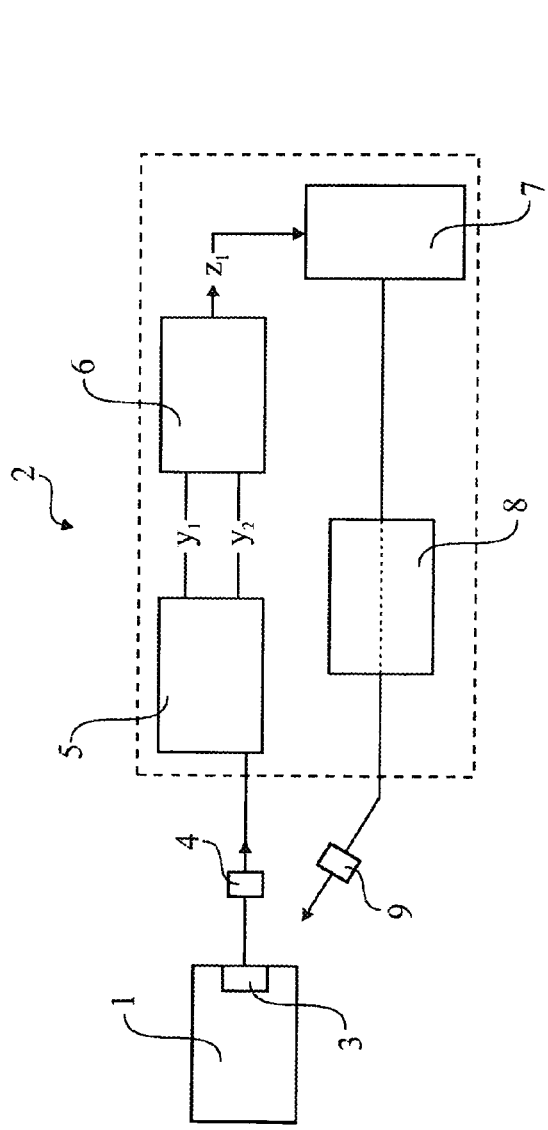
FIG. 1 shows a schematic preferred view of a method/system according to the invention.

In FIG. 1 there is schematically shown a combustion engine 1 arranged with a sensor 3. There is also shown a control unit 2, including a number of different components (as known per se), here exemplified as a first processing unit 5, a second processing unit 6, a comparison unit 7, and a control actuation unit 8. Moreover the figure shows that the data package of sensor signals 4 is transmitted from the sensor 3 to the control unit 2 and also that a control strategy data package 9 is transmitted from the control unit 2 to the combustion engine 1. Accordingly, as is known per se, the sensor 3 applied to the combustion engine 1 transmits signals 4 that are processed, in at least one processing unit 5 within a control unit 2, to thereafter deliver a detection variable $z_1$ which is compared in a comparison unit 7. The result from the comparison unit 7 being used within a control actuating unit 8 to possibly emit a control signal 9 for control of the engine 1 to avoid knocking.

According to the invention an improved control strategy may be achieved since the obtained detection variable $z_1$ is based on a combination of two sub-values $y_1$, $y_2$. Accordingly the first processing unit 5 is used to compute two different sub-values, by means of the in data from the sensor signal 4 (see FIG. 4A). Mathematically the method according to the invention may be described as follows:

Form a new detection variable;

$$z(k) = \sum_{l=1}^{L} (\lambda_l \cdot y_l(k))$$

where $\lambda_l$, $l = 1, \ldots L$, are weighting factors scaled[1] such that $\sum_{l=1}^{L} \lambda_l = 1$.

[1] The scaling is of no practical importance other than to make the weighting factor well defined.

Then form a new detection based on this new (combined) test variable. If the observations $y_1(k)$ are correlated with the knock intensity, then $z(k)$ will have improved detection characteristics as compared to when using only a subset of the available detection variables $y_1(k)$. In FIG. 4B there is presented the result according to the invention, which illustrates the improved detection performance with respect to the probability of correct knock detection and false alarm respectively. The graph represents the combination of two differently computed sensor signals as follows: $z(k)=\lambda \cdot y_1(k)+(1-\lambda)y_2(k)$. When $\lambda$ is 0 or 1 then $z(k)=y_2(k)$ or $z(k)=y_1(k)$ respectively and consequently merely one single information input is used, as would be the case according to prior art. According to the invention $\lambda$ will be between 0-1 and consequently information input from both sources/computations will be used and therefore the detection performance will be improved, as is evident from FIG. 4B which illustrates that the probability of false alarm ($P_F$) is decreased by $\Delta P_F$ and that the probability of correct knock detection is increased by $\Delta P_{OK}$.

Figure 2:
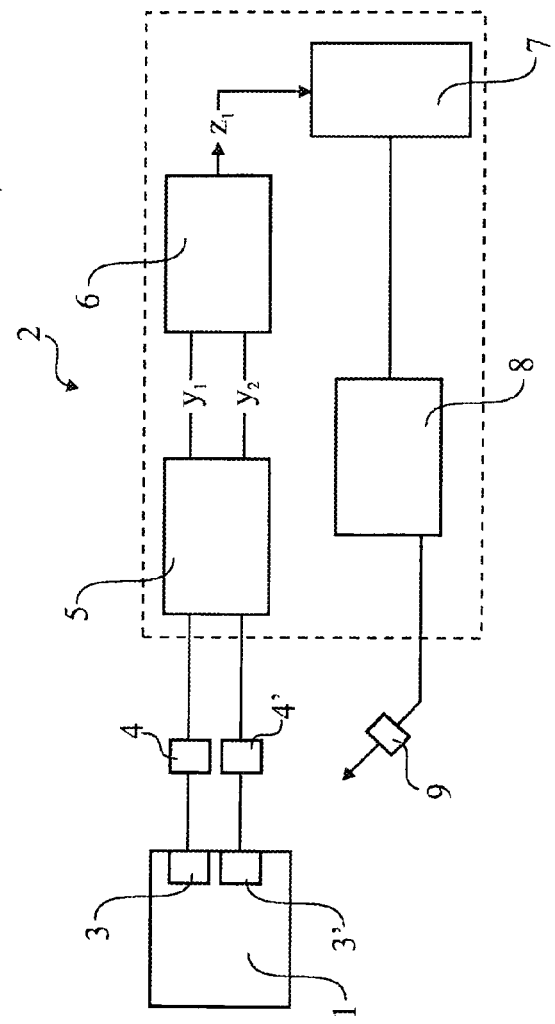
FIG. 2 shows a first modified embodiment according to the invention.
Figure 3:
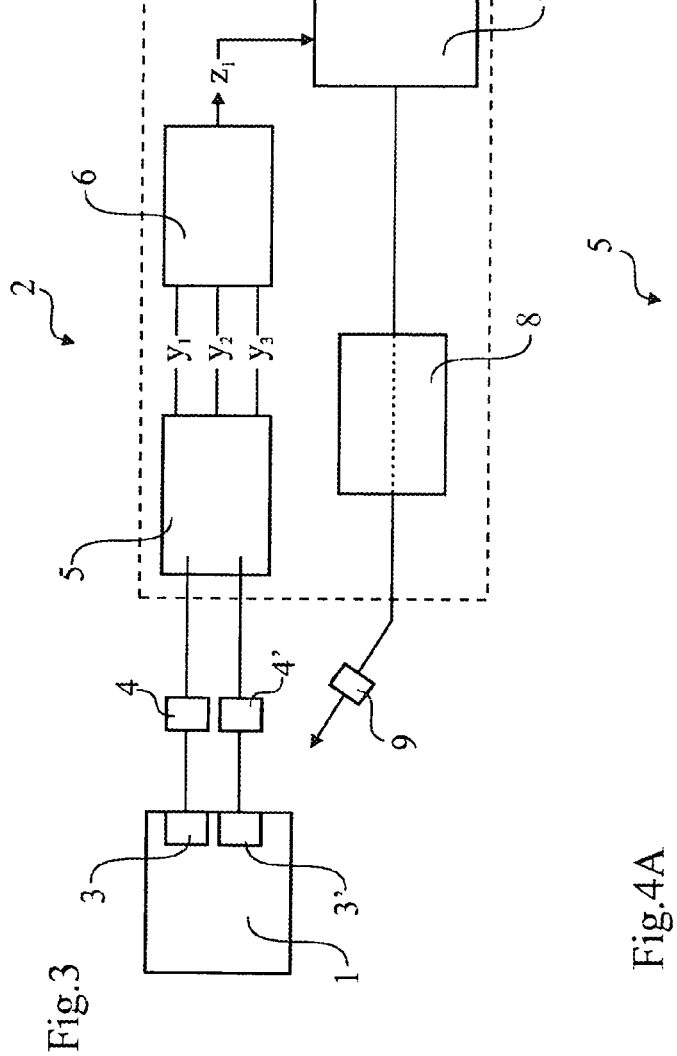
FIG. 3 shows a further modified embodiment,
FIG. 4 schematically shows a processing according to the invention.

In FIGS. 2 and 3 there are shown two of many different embodiments according to the invention. In FIG. 2 it is shown that two sensors 3, 3' are used and that the sensor signals 4, 4' are used as input data in the processing unit 5 from each one of said sensors 3, 3'. Hence, in these embodiments different input signals 4, 4' are used to obtain the different sub-values $y_1$, $y_2$.

In FIG. 3 there is shown an embodiment which is a combination of FIGS. 1 and 2, i.e. using one of the signals 4 to obtain two sub-values $y_1$, $y_2$ and a further sensor signal 4' from a second sensor 3' to achieve a third sub-value $y_3$.

Figure 4A:
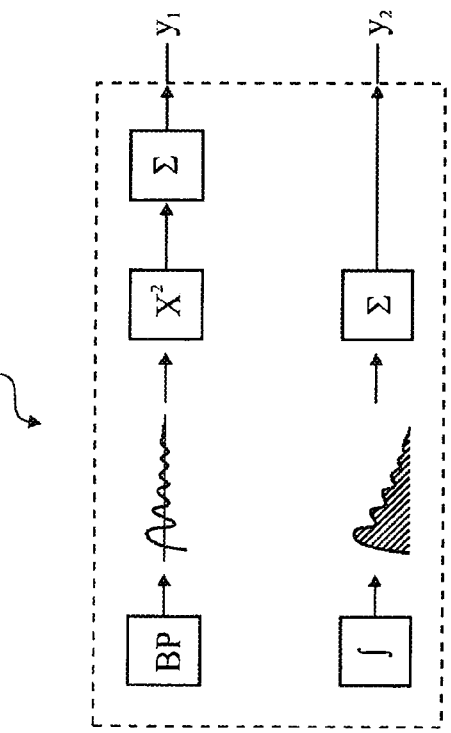
Figure 4B:
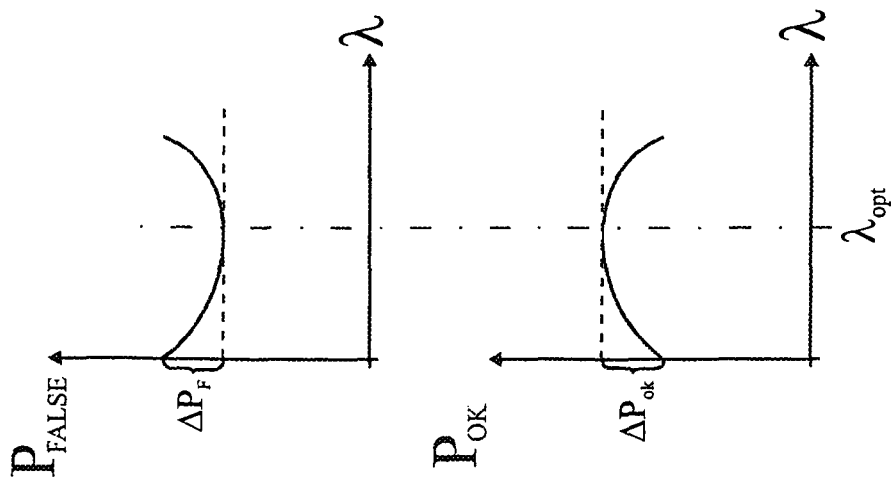

In FIG. 4A there is by way of example shown a schematic view of how different sub-values $y_1$, $y_2$ may be obtained from one and the same signal 4. Here one part of the processing resides in first band passing the signal 4 and thereafter computing it to achieve the first sub-value $y_1$ based on the frequency of the signal. The second value $y_2$ is obtained by integrating a chosen portion of the signal 4.

Figure 5:
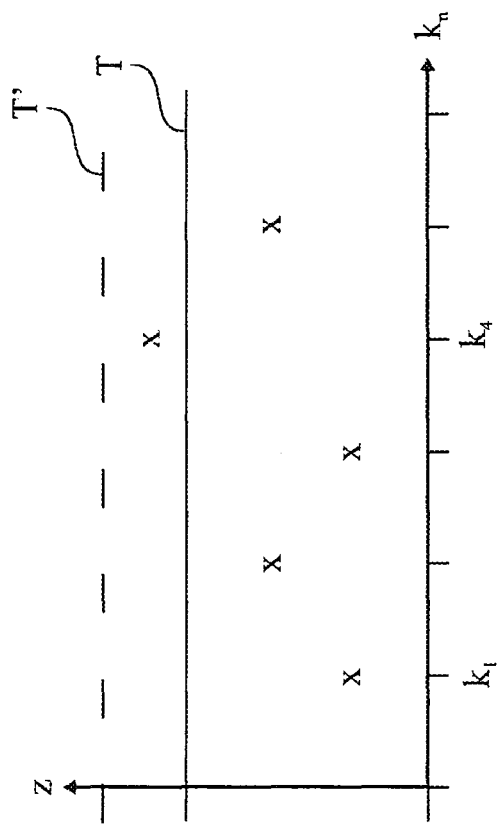
FIG. 5 shows a simple view of a control strategy that may be used in connection with the invention.

In FIG. 5 there is shown by way of example in a schematic manner how the values $z_k$ obtained according to the invention may be used in relation to control strategy implemented in the control actuation unit 8 of the control unit 2. Here an example is shown wherein a fixed threshold value T is used and accordingly no new control strategy for the combustion engine 1 will be given (by means of the control signal 9) for those detection points $k_1$, $k_2$, $k_3$, $k_5$ where the detection variable z (k) is below the threshold value T, but merely in relation to $k_4$ where the detection variable z ($k_4$) is above the threshold value T.

As stated above the detection can be made "blind" if the quality of the sensor output varies with the engine working point. This drawback can be alleviated by estimating necessary descriptive statistical entities and compute and possibly vary the threshold value T→T' accordingly (indicated as a dotted line in FIG. 5), thus yielding the detection strategy robust with respect to the working point. Hence, with such a detection strategy it might be the case that the threshold value T' would be adjusted upwardly to possibly allow the detection variable z ($k_4$) to not initiate any change of the control strategy. In order to do this, the amplification factors and the noise variances must be estimated.

The amplification parameters $\alpha_l$ and the corresponding noise variances $E[e_l^2(k)]=\sigma_l^2$ can be estimated using the reference measurements $$y_l(k) = \alpha_l \cdot x(k) + x(k) \cdot e_l(k) = x(k)(\alpha_l + e_l(k)) \Rightarrow \quad (1)$$

$$\alpha_l + e_l(k) = \frac{y_l(k)}{x(k)} \Rightarrow \quad (2)$$

$$\begin{cases} \hat{\alpha}_l = \sum_{k=1}^{N} \frac{y_l(k)}{x(k)} & (3) \\ \hat{\sigma}_l^2 = \frac{1}{N} \sum_{k=1}^{N} \left(\frac{y_l(k)}{x(k)} - \hat{\alpha}_l\right)^2 & (4) \end{cases}$$

The estimates $\hat{\alpha}_l$ and $\hat{\sigma}_l^2$ can be used to determine the threshold T to, e.g., give a certain probability of false alarm suitable for a certain application. Estimate the amplification factors and the noise variances over a selected grid of working points. Then the threshold can be made working point dependent.

In the case when multiple sensors are available (and not only multiple computations from a single sensor such as ion-current) it may be possible to estimate the amplification factors and corresponding noise variances from real-time data, thus yielding an adaptive mode of the threshold T.

Optimal scaling factors $\lambda_l$ can be determined using numerical simulations or from analytical expressions when this is feasible.

The invention is not delimited by the above given examples but may be varied within the scope of the enclosed claims. For instance, it is evident for the skilled person that the control unit 2 may be achieved in many different manners, e.g. not having a single unit 2 for all of the components 5, 6, 7, 8 for performing the desired computations/—activities, but instead having a distributed set of components. Moreover it is evident for skilled person that the described components are schematically presented and that the actual content of the control arrangement 2 may vary a lot depending on the desired needs of the actual application for the invention. Further it is evident for the skilled person within the field that the presented models for computation of different parameters is by way of example only, i.e. also other models may be used, e.g. the model for computing the amplification factor may instead be based on a more sophisticated noise model, etc. Finally it is perceived that the invention may also be applied in connection with detection/control of other combustion phenomena, e.g. misfire, unacceptable AFR, i.e. detection of deviation from a preferred value of a combustion parameter.

The invention claimed is:

1. A method for knock detection in a combustion engine, in which combustion is controlled by a control unit, which comprises the steps of,
   (a) obtaining at least one sensor signal carrying information of knock intensity within a combustion chamber of the combustion engine;
   (b) using different computations for processing the sensor signal to obtain at least two separate sub-values and thereafter combining said sub-values to obtain a knock intensity related detection variable,
   (c) comparing said detection variable with a threshold value, and
   (d) indicating knock if the value of said detection variable exceeds the threshold value.

2. The method according to claim 1, wherein said processing relates to computations correlated to knock intensity from one and the same sensor.

3. The method according to claim 2, wherein said sensor is an ion-sensor and said sub-values relate to the energy of a characteristic frequency and the integral of the ion current respectively.

4. The method according to claim 2, wherein said sensor is a pressure sensor and said sub-values relate to the energy of a characteristic frequency and the integral of the pressure trace respectively.

5. The method according to claim 1, wherein said processing relates to computation of sensor signals from different sensors.

6. The method according to claim 5, wherein said sensors comprise a combination of at least two of the following:
   a. an ion-sensor
   b. an accelerometer
   c. a pressure sensor.

7. The method according to claim 1, wherein said processing relates to computations of information from different combustion cycles.

8. The method according to claim 7, wherein said information related to knock intensity at cycle k is combined with information from cycle k+1.

9. The method according to claim 8, wherein said information related to knock intensity at cycle k is combined with information from cycle k+2.

10. The method according to claim 1, wherein said control includes comparing said detection variable with a threshold value and said threshold depends on the working point of the engine.

11. The method according to claim 10, wherein said control includes comparing said detection variable with a threshold value and said threshold depends on the sub-values.

12. A system for knock detection in a combustion engine, in which combustion is controlled by a control unit, comprising,
   at least one sensor arranged to deliver a sensor signal carrying information of knock intensity within a combustion chamber of the combustion engine,
   at least one processing unit arranged to deliver at least two sub-values from the at least one sensor signal and to combine said sub-values to deliver a knock intensity related detection variable,
   a comparison unit for comparing the detection variable with a threshold value, and
   a control actuation unit for indicating knock if the value of said detection variable exceeds the threshold value.

13. The system according to claim 12, wherein a signal from one sensor is used to deliver said at least two sub-values.

14. The system according to claim 12, wherein at least two signals from at least two sensors are used to deliver at least said two sub-values.

15. The system according to claim 14, wherein said sensors comprise a combination of at least two of the following:
   a) an ion-sensor,
   b) an accelerometer,
   c) a pressure sensor.

16. A method for knock detection in a combustion engine, in which combustion is controlled by a control unit, which comprises the steps of:
   (a) obtaining at least one sensor signal carrying information of knock intensity within a combustion chamber of the combustion engine;
   (b) using different computations for processing the sensor signal to obtain at least two separate sub-values and thereafter mathematically combining said sub-values in the form $$z(k) = \sum_{l=1}^{L} (\lambda_l \cdot y_l(k)),$$

with weighting factors $\lambda_l$, $l=1, \ldots L$ being between 0-1, to obtain a knock intensity related detection variable,
   (c) comparing said detection variable with a threshold value, and
   (d) indicating knock if the value of said detection variable exceeds the threshold value.

17. A system for knock detection in a combustion engine, in which combustion is controlled by a control unit, comprising,
   at least one sensor arranged to deliver a sensor signal carrying information of knock intensity within a combustion chamber of the combustion engine,
   at least one processing unit is arranged to deliver at least two sub-values from the at least one sensor signal and to mathematically combine said sub-values in the form $$z(k) = \sum_{l=1}^{L} (\lambda_l \cdot y_l(k)),$$

with weighting factors $\lambda_l$, $l=1, \ldots L$ being between 0-1, to deliver a knock intensity related detection variable,
   a comparison unit for comparing the detection variable with a threshold value, and
   a control actuation unit for indicating knock if the value of said detection variable exceeds the threshold value.

* * * * *